US010785441B2

(12) United States Patent
Candelore et al.

(10) Patent No.: US 10,785,441 B2
(45) Date of Patent: Sep. 22, 2020

(54) RUNNING TOUCH SCREEN APPLICATIONS ON DISPLAY DEVICE NOT HAVING TOUCH CAPABILITY USING REMOTE CONTROLLER HAVING AT LEAST A TOUCH SENSITIVE SURFACE (71) Applicant: Sony Corporation, Tokyo (JP)

(72) Inventors: Brant Candelore, Escondido, CA (US); Graham Clift, Poway, CA (US)

(73) Assignee: Sony Corporation, Tokyo (JP)

( * ) Notice: Subject to any disclaimer, the term of this patent is extended or adjusted under 35 U.S.C. 154(b) by 76 days.

(21) Appl. No.: 15/063,075

(22) Filed: Mar. 7, 2016

(65) Prior Publication Data
US 2017/0257593 A1 Sep. 7, 2017

(51) Int. Cl.
H04N 5/44 (2011.01)
H04N 21/482 (2011.01)
(Continued)

(52) U.S. Cl.
CPC ........... *H04N 5/4403* (2013.01); *G06F 3/038* (2013.01); *G06F 3/03547* (2013.01); *G06F 3/0416* (2013.01); *G06F 3/0488* (2013.01); *H04N 21/42224* (2013.01); *G06F 2203/0384* (2013.01); *H04N 2005/443* (2013.01); *H04N 2005/4408* (2013.01); *H04N 2005/4432* (2013.01)

(58) Field of Classification Search
CPC .................................................... H04N 5/4403
USPC ........................................................ 348/734
See application file for complete search history.

(56) References Cited

U.S. PATENT DOCUMENTS 5,805,165 A * 9/1998 Thorne, III ......... G06F 3/04842
715/823
8,370,878 B2 2/2013 Gharachorloo et al.
(Continued)

FOREIGN PATENT DOCUMENTS

CN 102150122 A 8/2011
CN 102968209 A 3/2013
(Continued)

OTHER PUBLICATIONS

Brant Candelore, Graham Clift, "Running Touch Screen Applications on Display Device Not Having Touch Capability Using a Remote Controller Not Having Any Touch Sensitive Surface", file history of related application filed Mar. 7, 2016.
(Continued)

*Primary Examiner* — Jefferey F Harold
*Assistant Examiner* — Justin B Sanders
(74) *Attorney, Agent, or Firm* — John L. Rogitz (57) ABSTRACT A TV without a touch screen can nonetheless execute applications designed for mobile devices that assume a touch screen user interface (UI) by a "dumb" remote control with up/down, left/right, select buttons, or by a remote control with a touch pad, or by a remote control application running on a mobile device with a touch-screen that communicates with the TV. In all three scenarios, the TV recognizes that it is running in a special remote control mode and with a corresponding remote control application running on the TV that is able to intercept key presses and finger swipes and translate them to touch screen commands that are input to a touch screen-enabled software application running on the TV.

10 Claims, 9 Drawing Sheets (51) Int. Cl.
*H04N 21/422* (2011.01)
*G06F 3/0354* (2013.01)
*G06F 3/0488* (2013.01)
*G06F 3/038* (2013.01)
*G06F 3/041* (2006.01)

(56) References Cited

U.S. PATENT DOCUMENTS

| | | | |
|---|---|---|---|
| 8,601,461 B2 | 12/2013 | Vrijsen | |
| RE44,694 E | 1/2014 | Lee | |
| 8,997,009 B2 | 3/2015 | Bechtel | |
| 9,088,749 B2 | 7/2015 | Li | |
| 9,247,174 B2 | 1/2016 | Sirpal et al. | |
| 9,760,315 B2 * | 9/2017 | Taguchi | G06F 3/0673 |
| 2006/0028454 A1 * | 2/2006 | Branton | G06F 3/03547 |
| | | | 345/173 |
| 2008/0284726 A1 * | 11/2008 | Boillot | G06F 3/0304 |
| | | | 345/156 |
| 2011/0193727 A1 | 8/2011 | Goto et al. | |
| 2011/0246903 A1 | 10/2011 | Shinohara et al. | |
| 2012/0208639 A1 * | 8/2012 | Reynolds | G06F 3/0488 |
| | | | 463/36 |
| 2013/0229508 A1 | 9/2013 | Li et al. | |
| 2013/0324850 A1 * | 12/2013 | Petruzzelli | A61B 8/467 |
| | | | 600/443 |
| 2013/0328778 A1 | 12/2013 | Chen et al. | |
| 2014/0229847 A1 * | 8/2014 | Park | G06F 1/1684 |
| | | | 715/744 |
| 2014/0267932 A1 * | 9/2014 | Riddell | H04N 5/4403 |
| | | | 348/734 |
| 2014/0333964 A1 | 11/2014 | Ueda et al. | |
| 2015/0009143 A1 * | 1/2015 | Masaki | G06F 3/03547 |
| | | | 345/158 |
| 2015/0113566 A1 | 4/2015 | Koderisch | |
| 2015/0193138 A1 | 7/2015 | Relyea et al. | |
| 2015/0288912 A1 | 10/2015 | Chun et al. | |
| 2015/0334334 A1 | 11/2015 | White et al. | |
| 2016/0071241 A1 * | 3/2016 | Karunamuni | G06T 3/60 |
| | | | 345/156 |
| 2016/0216885 A1 * | 7/2016 | Fan | G06F 3/04883 |
| 2016/0259535 A1 * | 9/2016 | Fleizach | G09B 21/006 |
| 2017/0115765 A1 * | 4/2017 | Moraes | G06F 3/0416 |

FOREIGN PATENT DOCUMENTS

| | | |
|---|---|---|
| CN | 103106104 A | 5/2013 |
| CN | 102937876 B | 3/2017 |
| WO | 2014210304 A1 | 12/2014 |

OTHER PUBLICATIONS

Brant Candelore, Graham Clift, "Running Touch Screen Applications on Display Device Not Having Touch Capability Using a Remote Controller Not Having Any Touch Sensitive Surface", related U.S. Appl. No. 15/062,835, Non-Final Office Action dated Mar. 9, 2017.

Brant Candelore, Graham Clift, "Running Touch Screen Applications on Display Device Not Having Touch Capability Using Remote Controller Not Having Any Touch Sensitive Surface", related U.S. Appl. No. 15/062,835, Applicant's response to Non-Final Office Action filed Mar. 13, 2017.

Brant Candelore, Graham Clift, "Running Touch Screen Applications on Display Device Not Having Touch Capability Using a Remote Controller Not Having Any Touch Sensitive Surface", Final Office Action dated Jun. 30, 2017.

Brant Candelore, Graham Clift, "Running Touch Screen Applications on Display Device Not Having Touch Capability Using a Remote Controller Not Having Any Touch Sensitive Surface", Applicant's response to Final Office Action filed Jul. 13, 2017.

* cited by examiner

FIG. 3 TV logic

RUNNING TOUCH SCREEN APPLICATIONS ON DISPLAY DEVICE NOT HAVING TOUCH CAPABILITY USING REMOTE CONTROLLER HAVING AT LEAST A TOUCH SENSITIVE SURFACE

FIELD

This patent application relates generally to running touch screen software applications on display devices that do not have touch screen capability.

BACKGROUND

Many modern TVs including Sony TVs are operated by internal processors executing an operating system such as but not limited to Android®. There are many thousands of mobile Android applications, but relatively few Android applications for TVs primarily because most Android applications assume a touch screen interface that is common to mobile devices such as smart phones and tablet computers but not to high definition TVs, which instead employ "remote control" or "remote control with touch pad" interfaces.

SUMMARY

As understood herein, while application developers can rewrite their applications to use non-touch interfaces, for various reasons the costs of doing so may not be justified. Thus, a need exists to enable Android-based TVs to execute applications designed for mobile devices that are unmodified and downloadable to the TVs as if for mobile devices enabled with "touch screen" interfaces.

As further understood herein, so-called "mirroring", wherein an image of the touch user interface (UI) on the mobile device is sent from the mobile device for display on the TV, is less than optimum. One reason is because mirroring requires Wi-Fi, and when the mobile device invokes mirroring, it can lose its Internet connection through the Wi-Fi access point. If the application being mirrored requires an Internet connection and it is no longer available, then the application may fail. Furthermore, mobile graphics mirrored to a high definition TV (HDTV) may be inferior to that generated by the TV itself. Further still, mirroring ties up the mobile device and can prevent or interfere with it from being used for an incoming phone call or text while mirroring is taking place. Yet again, depending on how Wi-Fi is implemented, the TV may lose information about the wireless access point after a mirroring session requiring re-input of access point information. And yet again, in some Wi-Fi implementation, the TV must be in standby mode before mirroring can be invoked, and if the TV is not in standby mode, then it is possible for the TV software to lock-up and require a re-boot. And, mirroring can also be difficult on the mobile device in some implementations, causing the mobile device to sometimes crash, causing a re-start to be required. For various reasons, it may therefore be desirable to run the touch-application on the TV itself and not the mobile device.

Accordingly, an apparatus includes at least one computer memory that is not a transitory signal and that in turn includes instructions executable by at least one processor to determine that an audio video display device (AVDD) is executing a software application. The software application includes a user interface (UI) that is enabled for touch screen input. The instructions are executable to wirelessly receive non-touch screen signals from a remote control (RC) that does not have a touch sensitive display and that has a touch sensitive input surface, and translate the non-touch screen signals to corresponding touch screen signals. The touch signals are then executed on the AVDD.

In example embodiments, the display of the AVDD is not touch sensitive. And the display of the AVDD may actually be touch sensitive but not used, to allow for remote control of the touch-enabled UI executing on the AVDD. This would the case where the device is used primarily visually, e.g. "Google Cardboard" where a mobile device is mounted into a cardboard holder device mounted in front of a person's eyes to show 3D and virtual reality content. With the display deployed so close to the person's eyes, the touch screen is impractical to use. The principles describe below apply equally well for this and other situations where use of the touch screen may not be desired as well as where the AVDD display is not touch sensitive.

In some examples, the non-touch screen signals include a first signal generated by a first gesture on the touch sensitive input surface, and the instructions are executable to translate the first signal to a select signal on the UI at a location on the UI defined by at least a second signal generated by manipulation of a directional key on the RC.

In at least one non-limiting example embodiment, the non-touch screen signals include a first signal generated by a first gesture on the touch sensitive input surface, and the instructions are executable to translate the first signal to a double tap touch screen signal on the UI at a location on the UI defined by at least a second signal generated by manipulation of a directional key on the RC.

In at least one non-limiting example embodiment, the non-touch screen signals include a first signal generated by first gesture on the touch sensitive input surface, and the instructions are executable to translate the first signal to a swipe touch screen signal on the UI at a location on the UI defined by at least a second signal generated by manipulation of a directional key on the RC.

In at least one non-limiting example embodiment, the non-touch screen signals include a first signal generated by a first gesture on the touch sensitive input surface and a second signal generated by manipulation of a directional key on the RC, and the instructions are executable to translate the first and second signals to a long press and drag touch screen signal on the UI at a location on the UI defined by at least a third signal generated by manipulation of a directional key on the RC.

In at least one non-limiting example embodiment, the non-touch screen signals include a first signal generated by a first gesture on the touch sensitive input surface, and the instructions are executable to translate fee first signal to a pinch open touch screen signal on the UI. Also, the non-touch, screen signals may include a second signal generated by a second gesture on the touch sensitive input surface different from the first gesture, and the instructions are executable to translate the second signal to a pinch closed touch screen signal on the UI.

In at least one non-limiting example embodiment, the non-touch screen signals include a first signal generated by a first single finger gesture on the touch sensitive input surface, and the instructions are executable to translate the first signal to a two finger touch screen signal on the UI.

In at least one non-limiting example embodiment, the non-touch screen signals include a first signal generated by a first gesture on the touch sensitive input surface, and the instructions are executable to translate the first signal to a rotate touch screen signal on the UI.

In another aspect, an apparatus includes at least one computer memory that is not a transitory signal and that in turn includes instructions executable by at least one processor for executing an application on an audio video display device (AVDD) including a user interface (UI) enabled for touch commands. The AVDD does not have a touch sensitive display. The instructions are executable for, responsive to determining that the AVDD is in a touch screen mode, presenting on the display a cursor, and receiving, from a mobile computing device (MCD) having touch screen capability, touch screen signals. The instructions are also executable for moving the cursor according to the touch screen signals from the MCD, and for executing at least one function of the application on the AVDD according to the touch screen signals from the MCD.

In same embodiments, the UI is not sent to the MCD. In other embodiments, the UI can be sent to the MCD for presentation of the UI on a touch sensitive display of the MCD.

In another aspect, an audio video display device (AVDD) includes at least one video display that is not touch sensitive, and at least one processor configured for executing at least one application for presenting on the video display at least one user interface (UI) of the application enabled for touch input. The AVDD also includes at least one computer memory accessible to the at least one processor and including instructions executable for receiving, from a mobile computing device (MCD) having touch screen capability, touch screen signals. The instructions are executable for, responsive to receiving a touch screen signal from the MCD, presenting a cursor on the display of the AVDD and executing at least one function of the application on the AVDD according to the touch screen signals from the MCD. The instructions are further executable for automatically removing the cursor from the display of the AVDD.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser programs that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as hut not limited to C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). The AVDD 12 may be an Android®-based system. The AVDD 12 alternatively may also be a computerized internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 and/or other computers described herein is configured to undertake present principles (e.g. communicate with other CE devices to undertake present principles, execute the logic described herein, and perform any other functions and/or operations described herein).

Figure 1:
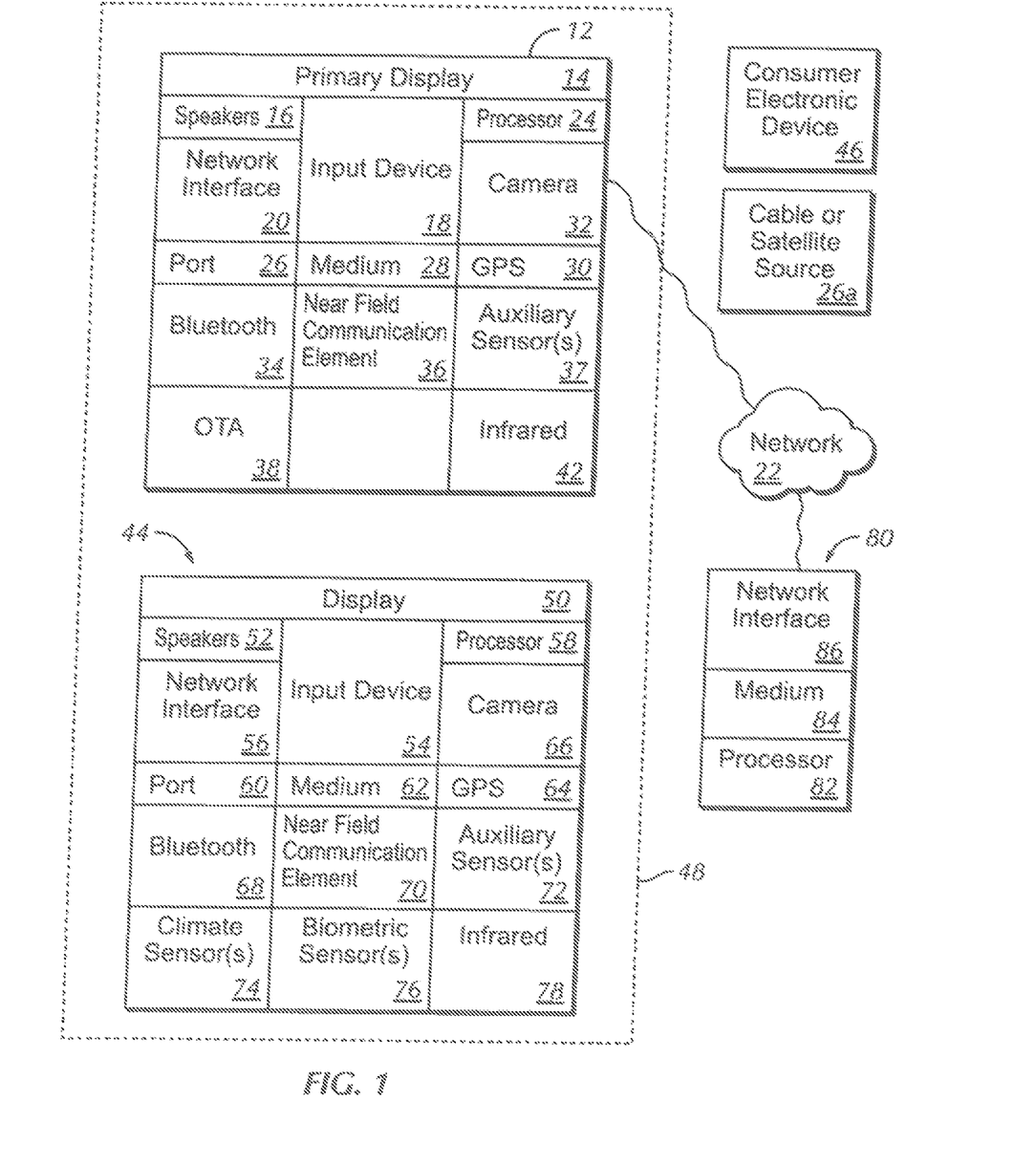
FIG. 1 is a block diagram of an example system including an example in accordance with present principles.

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may or may not be touch-enabled for receiving user input signals via touches on the display. Present principles are particularly useful for the circumstance in which the display 14 is not touch-enabled. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, a PAN etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth, transceiver, Zigbee transceiver, IrDA transceiver, Wireless USB transceiver, wired USB, wired LAN, Powerline or MoCA, It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more computer memories 28 such as disk-based or solid state storage that are not transitory signals, in some cases embodied in the chassis of the AVDD as standalone devices or as a personal video recording device (PVR) or video disk player either internal or external to the chassis of the AVDD for playing back AV programs or as removable memory media. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor for receiving IR commands from a remote control, an optical sensor, a speed and/or cadence sensor, a gesture sensor (e.g. for sensing gesture command), etc) providing input to the processor 24. The AVDD 12 may include an over-the-air TV broadcast port 38 for receiving OTH TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other computer device types that may include some or all of the components shown for the AVDD 12. In one example, a first device 44 and a second device 46 are shown and may include similar components as some or all of the components of the AVDD 12. Fewer or greater devices may be used than shown.

In the example shown, to illustrate present principles all three devices 12, 44, 46 are assumed to be members of a local network in, e.g., a dwelling 48, illustrated by dashed lines.

The example non-limiting first device 44 may include one or more touch-sensitive surfaces 50 such as a touch-enabled video display for receiving user input signals via touches on the display. The first device 44 may include one or more speakers 52 for outputting audio in accordance with present principles, and at least one additional input device 54 such as e.g. an audio receiver/microphone for e.g. entering audible commands to the first device 44 to control the device 44. The example first device 44 may also include one or more network interfaces 56 for communication over the network 22 under control of one or more vehicle processors 58 such as an engine control module (ECM). Thus, the interface 56 may be, without limitation, a Wi-Fi transceiver, which is an example of a wireless computer network interface, including mesh network interfaces. It is to be understood that the processor 58 controls the first device 44 to undertake present principles, including the other elements of the first device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first device 44 may also include one or more input ports 60 such as, e.g., a HDMI port or a USB port to physically connect (e.g. using a wired connection) to another computer device and/or a headphone port to connect headphones to the first device 44 for presentation of audio from the first device 44 to a user through the headphones. The first device 44 may further include one or more tangible computer readable storage medium 62 such as disk-based or solid state storage. Also in some embodiments, the first device 44 can include a position or location receiver such as but not limited to a cellphone and/or GPS receiver and/or altimeter 64 that is configured to e.g. receive geographic position information from at least one satellite and/or cell tower, using triangulation, and provide the information to the device processor 58 and/or determine an altitude at which the first device 44 is disposed in conjunction with the device processor 58. However, it is to be understood that that another suitable position receiver other than a cellphone and/or GPS receiver and/or altimeter may be used in accordance with present principles to e.g. determine the location of the first device 44 in e.g. all three dimensions.

Continuing the description of the first device 44, in some embodiments the first device 44 may include one or more cameras 66 that may be, e.g., a thermal imaging camera, a digital camera such as a webcam, etc. Also included on the first device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, fee first device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first device 44 may include still other sensors such as e.g. one or more climate sensors 74 (e.g. barometers, humidity sensors, wind sensors, light sensors, temperature sensors, etc.) and/or one or more biometric sensors 16 providing input to the device processor 58. In addition to the foregoing, it is noted that in some embodiments the first device 44 may also include an infrared (IR) transmitter and/or IR receiver and/or IR transceiver 42 such as an IR data association (IRDA) device. A battery may be provided for powering the first device 44. The device 44 may communicate with the AVDD 12 through any of the above-described communication modes and related components.

The second device 46 may include some or all of the components described above.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers, controllers, and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform, "cloud" functions such that the devices of the system 10 may access a "cloud" environment via the server 80 in example embodiments. Or, the server 80 may be implemented fey a game console or other computer in the same room as the other devices shown in FIG. 1 or nearby.

The TV described below may incorporate some or all of the elements of the AVDD 12 described above. The remote commanders described below may include some or all of the components of the CE device 44 described above.

Figure 2:
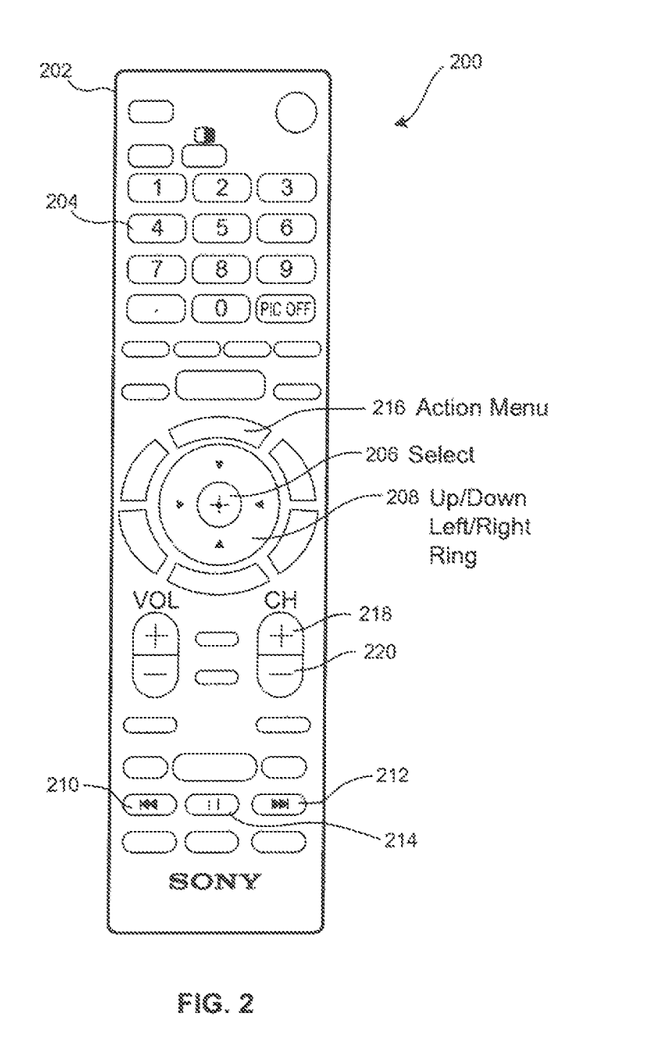
FIG. 2 is a schematic diagram of an example "dumb" remote control (RC)

FIG. 2 shows remote control (RC) 200 that may be shipped with the AVDD 12. As shown, the RC 200 does not have a touchpad and hence does not require a special touch sensor as would a touchpad.

As shown, the example RC 200 typically includes a portable hollow plastic hand-held housing 202 with a numeric keypad 204 and a center "select" key 206. Also, the RC 200 may include a disc-shaped direction ring 208 with up/down and left/right rocker surfaces as shown. The RC 200 may also include fast rewind and last forward keys 210, 212 and a pause key 214. An action key 216 may also be included on the RC 200, as can channel up and own keys 218, 220. Disclosure below explains how these keys can be used to translate key presses into touch screen commands, in being understood that they are example keys for use and that other keys on the RC 200 shown in FIG. 2 may be alternately used for the same purposes.

Figure 3:
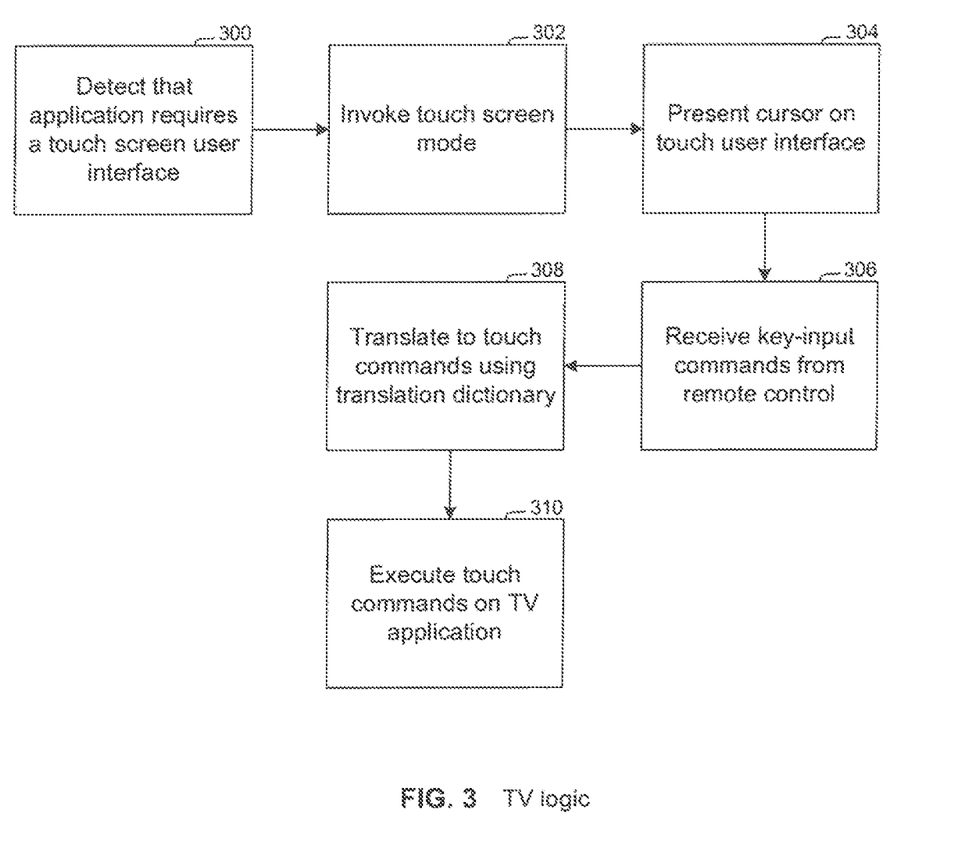
FIG. 3 is a flow chart of example logic that can be executed by the AVDD to translate key press commands from the "dumb" RC of FIG. 2 to touch commands.

FIG. 3 illustrates logic that may be executed by the AVDD processor described above running an operating system such as one based on Android®, on which Android software applications may execute. Commencing at block 300, the AVDD detects that an application has been invoked that requires a touch screen UI. The AVDD can do this by examining the requirements for the application. If the requirements list "touch screen", then the AVDD will know that UI adaption will be required. Alternatively, the application may have been invoked by a user manipulating a key on the RC 200 such as a video source provider key or other key. The AVDD 12 may determine that the invoked application requires a touch screen by inference on the basis that the AVDD 12 downloaded the application from a mobile device software section of an application provider website. Or, a key on the RC 200 may be mapped to a command to "invoke touch screen mode". For example, manipulation of the action key 216 may command the AVDD 12 to enter the touch screen mode.

Regardless of how determined, the touch screen mode is invoked at block 302 and a touch interface is presented on the display 14 along with a screen cursor, such as a finger icon or band icon, at block 304. IR signals from the RC generated by user manipulation of RC key(s) are received, at block 306 and translated to touch commands using a translation data structure at block 308. The touch commands are executed on the software application running on the AVDD 12 at block 310.

An example translation data structure, which may be regarded as a translation dictionary, is given here by way of illustration. In general, the UP/DOWN LEFT/RIGHT ring 208 is manipulated to pan the cursor around the UI presented on the AVDD display 14.

Single Touch

This command may be used to select a screen object on the UI presented on the AVDD.

After using the Up/Down Left/Right ring 208 to pan the cursor over the application user interface, the IR signal from the RC corresponding to one manipulation (press down and lift up) of the select key 206 is translated by the AVDD 12 to a touch at the location of the UI the cursor is positioned over.

Double Touch

This command may be used to zoom in on the UI presented on the AVDD.

After using the Up/Down Left/Right ring 208 to pan the cursor over the application user interface, the IR signal from the RC corresponding to two manipulations (press down and lift up twice) of the select key 206 is translated by the AVDD 12 to a double touch at the location of the UI the cursor is positioned over.

Swipe

This command may be used to dismiss, scroll, or tilt the UI presented on the AVDD.

After using the Up/Down Lefty Right ring 208 to pan the cursor over the application user interface to an initial cursor position, the IR signal from the RC corresponding to a single manipulation of the select key 206 followed by manipulation of the rocker ring 208 (typically within a predetermined time period) is translated to a command to cause the screen cursor to swipe (e.g., for a default screen distance) in the direction the rocker ring 208 is manipulated, starting from the initial, position of the cursor and continuing from there in the up or down or left or right direction on the AVDD 14 as dictated by the manipulation of the rocker ring 208.

Long Press

This command may be used to select a list item on the UI presented on the AVDD.

After using the Up/Down Left/Right ring 208 to pan the cursor over the application user interface to an initial cursor position, the IR signal from the RC corresponding to a double manipulation of the select key 206 but, e.g., with the two presses separated from each other by a lengthier time period than required for a double press command, is translated to a long press command.

Long Press-Drug

This command may be used to pick and move a screen object on the UI presented on the AVDD.

After using the Up/Down Left/Right ring 208 to pan the cursor over the application user interface to an initial cursor position, the IR signal from the RC corresponding to a double manipulation of the select key 206 but, e.g., with the two presses separated from each other by a lengthier time period than required for a double press command, is translated to a long press command as above, and if it is followed (typically within a predetermined time period) by manipulation of the rocker ring 208, the translation is for the screen cursor to swipe (e.g., for a default screen distance) in the direction the rocker ring 208 is manipulated, starting from the initial position of the cursor and continuing from there in the up or down or left or right direction on the AVDD 14 as dictated by the manipulation of the rocker ring 208.

Double Touch-Drag

This command may be used to zoom in and out on the UI presented on the AVDD.

After panning over the application user interface using the ring 208, the Select button 206 is depressed once, there is a pause of a time period within a range reserved for this command, the Select button is depressed again, and the Up/Down Left/Right Ring is used to "swipe" the appropriate direction.

Pinch Open

Figure 4:
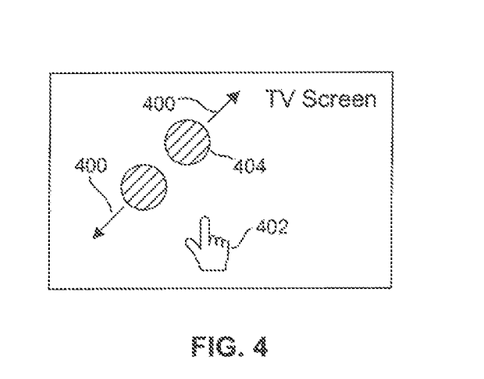
FIGS. 4-6 are schematic views of the UI presented on the AVDD executing the logic of FIG. 3, illustrating certain types of commands.

After using the Up/Down Left/Right ring 208 to pan the cursor over the application user interface to an initial cursor position, the IR signal from the RC corresponding to a manipulation of the fast reverse key 210 is translated to a pinch open command as indicated by the arrows 400 in FIG. 4, also showing the cursor 402 as a hand icon. Here, "pinch open" causes a zoom-out function as if objects 404 were pinched away from each other by two fingers making a pinch sway gesture.

Pinch Closed

Figure 5:
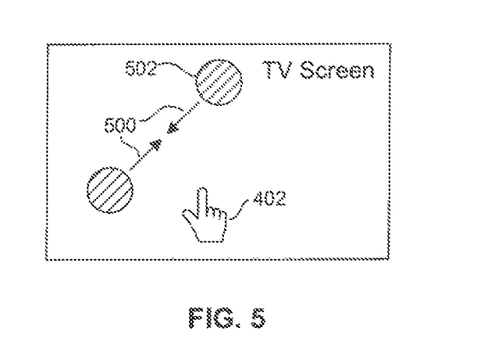

After using the Up/Down Left/Right ring 208 to pan the cursor over the application user interface to an initial cursor position, the IR signal from the RC corresponding to a manipulation of the fast forward key 212 is translated to a pinch closed command as indicated by the arrows 500 in FIG. 5. Here, "pinch closed" causes a zoom-in function to be implemented on the AVDD display 14 as if objects 502 were pinched toward each other by two fingers making a pinch toward gesture.

Two Finger Touch

Figure 6:
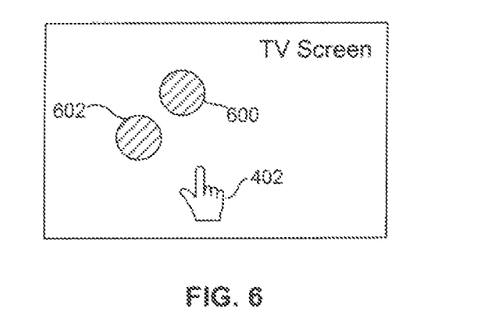

After using the Up/Down Left/Right ring 208 to pan the cursor over the application user interface to an initial cursor position, the IR signal from the RC corresponding to a manipulation of the pause key 214 is translated to a simultaneous two finger touch at locations 600, 602 on the UI of FIG. 6 adjacent or underneath the cursor 402.

Two Finger Swipe

This command may be used to select multiple screen objects on the UI presented on the AVDD, pan, and tilt.

After using the Up/Down Left/Right ring 208 to pan the cursor over the application user interface to an initial cursor position, the Hi signal from the RC corresponding to a manipulation of the pause key 214 followed by manipulation of the rocker ring 208 is translated to a simultaneous two finger touch at locations on the UI adjacent or underneath the cursor 402 and a screen cursor swipe (e.g., for a default screen distance) in the direction the rocker ring 208 is manipulated, starting from the initial position of the cursor and continuing from there in the up or down or left or right direction on the AVDD 14 as dictated by the manipulation of the rocker ring 208.

Two Finger Long Press

After using the Up/Down Left/Right ring 208 to pan the cursor over the application user interface to an initial cursor position, the IR signal from the RC corresponding to a manipulation of the pause key 214 twice is translated to a simultaneous two linger long touch, at locations on the UI adjacent or underneath the cursor 402.

Two Finger Long Press and Swipe or Drag

This gesture may be used to pick up and move a screen object on the AVDD UI. It uses the two finger long press command of the RC above followed by manipulation of the rocker ring 208 in the desired direction of the swipe or drag, which is translated accordingly.

Two Finger Double Touch

This gesture may be used to implement a zoom out function. After using the Up/Down Left/Right ring 208 to pan the cursor over the application user interface to an initial cursor position, the IR signal from the RC corresponding to a manipulation of the pause key 214 twice, albeit with a different time period between manipulations than used for the two finger long press described above, is translated to a simultaneous two finger long touch at locations on the UI adjacent or underneath the cursor 402.

Rotate

This gesture may be used to rotate presented content such as a map on the AVDD display 14. After using the Up/Down Left/Right ring 208 to pan the cursor over the application user interface to an initial cursor position, the IR signal from the RC corresponding to a manipulation of the pause key 214, followed by manipulation of the channel up key 218, is translated as a clockwise rotation touch command. The IR signal from the RC corresponding to a manipulation of the pause key 214, followed by manipulation of the channel down key 220, can be translated as a counterclockwise rotation touch command.

In the example above, the "dumb" RC 200 need not have any code to support touch screen UI input on the AVDD 12; the AVDD 12 handles all of the translation and it is the only component requiring an application to execute touch input on UIs presented on its non-touch display 14. In the examples below, on the other hand, the RCs are also supplemented with code complementary to that executed on the AVDD.

Figure 7:
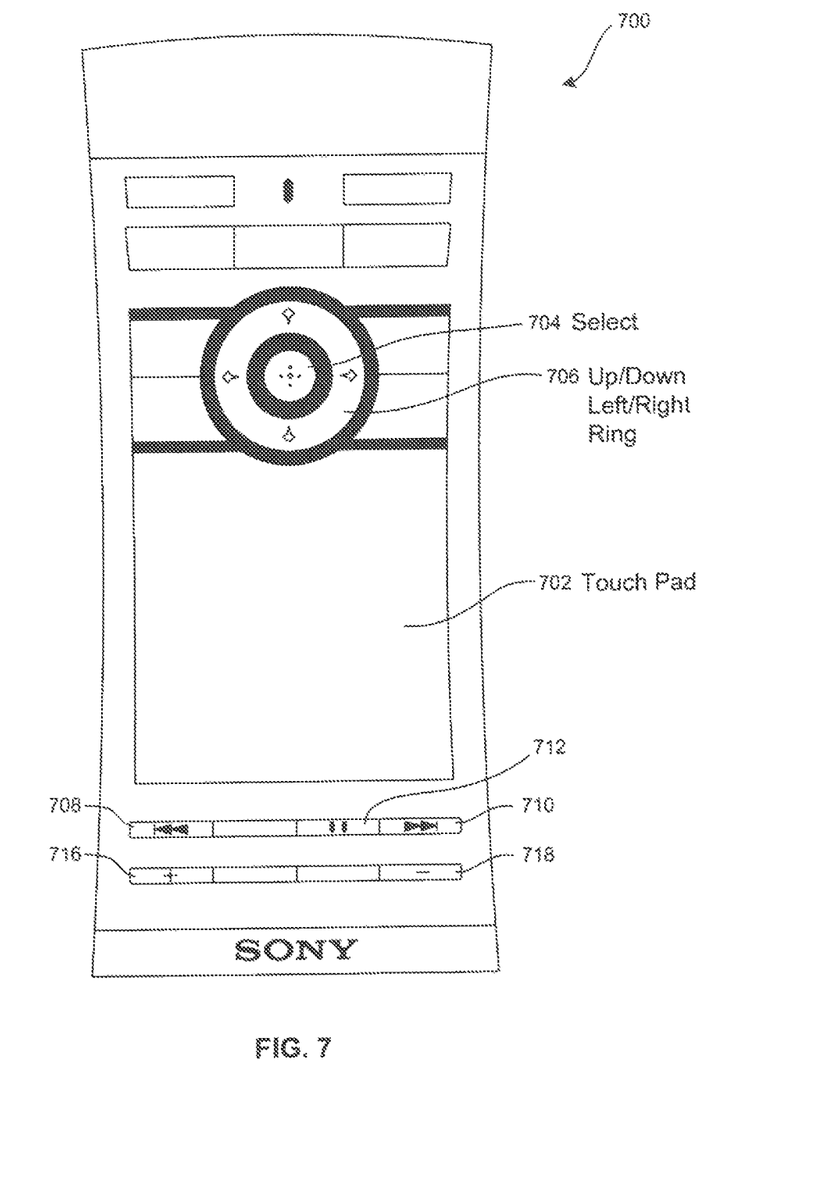
FIG. 7 is a schematic diagram of an example remote control (RC) with a touch pad but no touch-sensitive display.

FIG. 7 illustrates a RC 700 that is not a general purpose mobile computing device such as a smart phone or a tablet computer but that has a touch pad 702. The RC 700 thus is less expensive than a general purpose mobile computing device although the touch pad 702 may be able to sense only a single finger touch at a time, and may not be able to sense a double touch. Generally, the AVDD 12 executes an application to undertaken steps 300-304 in FIG. 3 when the RC 700 is used, with user input being via the RC 700 and with translation to touch commands executed by either the RC 700 and sent as such to the AVDD for implementation, or with the RC 700 not translating input commands it receives but only sending them wirelessly (such as by IR) to the AVDD for both translation and implementation by the AVDD using principles above in accordance with, e.g., an example correspondence data structure set forth below.

As shown in FIG. 7, the RC 700 includes, in addition to the touch pad 702, a center "select" key 704 and a disc-shaped, direction ring 706 with up/down and left/right rocker surfaces as shown. Fast reverse and fast forward keys 708, 710 and a pause key 712 may also be provided, as can be channel up and down keys 716, 718. Disclosure below explains how these keys can be used to translate key presses into touch screen commands, it being understood that they are example keys for use and that other keys on the RC 700 shown in FIG. 7 may be alternately used for the same purposes.

Single Touch

This command may be used to select a screen object on the UI presented on the AVDD.

After using the Touch pad 702 to pan the cursor over the application user interface, the IR signal from the RC corresponding to one manipulation (press down and lift up) of the select key 704 is translated by the AVDD 12 to a touch at the location of the UI the cursor is positioned over.

Double Touch

This command may be used to zoom in on the UI presented on the AVDD.

After using the Touch pad 702 to pan the cursor over the application user interface, the IR signal from the RC corresponding to two manipulations (one finger press down and lift up twice) of the select key 704 is translated by the AVDD 12 to a double touch at the location of the UI the cursor is positioned over.

Swipe

This command may be used to dismiss, scroll, or tilt the UI presented on the AVDD.

After using the Touch pad 702 to pan the cursor over the application user interface to an initial cursor position, the IR signal from the RC corresponding to a single manipulation of the select key 704 followed by a swipe on the touch pad 702 (typically within a predetermined time period) is translated to a command to cause the screen cursor to swipe (e.g., for a default screen distance) in the direction of the swipe on the touch pad 702, starting from the initial position of the cursor and continuing from there in the up or down or left or right direction on the AVDD 14 as dictated by the manipulation of the touch pad 702.

Long Press

This command may be used to select a list item on the UI presented on the AVDD.

After using the Touch pad 702 to pan the cursor over the application user interface to an initial cursor position, the IR signal from the RC corresponding to a double manipulation of the select key 704 but, e.g., with the two presses separated from each other by a lengthier time period than required for a doable press command, is translated to a long press command.

Long Press-Drag

This command may be used to pick and move a screen object on the UI presented on the AVDD.

After using the Touch pad 702 to pan the cursor over the application user interface to an initial cursor position, the IR signal from the RC corresponding to a double manipulation of the select key 704 but, e.g., with the two presses separated from each other by a lengthier time period than required for a doable press command, is translated to a long press command as above, and if it is followed (typically within a predetermined time period) by a one finger swipe on the touch pad 702, the translation is for the screen cursor to swipe (e.g., for a default screen distance) in the direction the swipe on the touch pad 702, starting from the initial position of the cursor and continuing from there in the up or down or left or right direction on the AVDD 14 as dictated by the manipulation of the touch pad 702.

Double Touch-Drug

This command may be used to zoom in and out on the UI presented on the AVDD.

After panning over the application user interface using the touch pad 702, the Select button 704 is depressed once, there is a pause of a time period within a range reserved for this command, the Select button is depressed again, and the user swipes the touch pad 702 in the appropriate direction.

Pinch Open

After using the Touch pad 702 to pan the cursor over the application user interface to an initial cursor position, the IR signal from the RC corresponding to a manipulation of the fast reverse key 708 is translated to a pinch open command to cause a zoom-out function on the UI presented on the AVDD display 14.

Pinch Closed

After using the Touch pad 702 to pan the cursor over the application user interface to an initial cursor position, the IR signal from the RC corresponding to a manipulation of the last forward key 710 is translated to a pinch open command to cause a zoom-in function on the UI presented on the AVDD display 14.

Two Finger Touch

After using the Touch pad 702 to pan the cursor over the application user interface to an initial cursor position, the IR signal from, the RC corresponding to a manipulation of the pause key 712 is translated to a simultaneous two finger touch at locations on the UI adjacent or underneath the cursor.

Two Finger Swipe

This command may be used to select multiple screen objects on the UI presented on the AVDD, pan, and tilt.

After using the Touch pad 702 to pan the cursor over the application user interface to an initial cursor position, the IR signal from the RC corresponding to a manipulation of the pause key 712 followed by manipulation of the touch pad 702 is translated to a simultaneous two finger touch at locations on the UI adjacent or underneath the cursor and a screen cursor swipe (e.g., for a default screen distance) in the direction the touch pad 702 is swiped, starting from the initial position of the cursor and continuing from there in the up or down or left or right direction on the AVDD 14 as dictated by the manipulation of the touch pad 702.

Two Finger Long Press

After using the Touch pad 702 to pan the cursor over the application user interface to an initial cursor position, the IR signal from the RC corresponding to a manipulation of the pause key 712 twice is translated to a simultaneous two finger long touch at locations on the UI adjacent or underneath the cursor.

Two Finger Long Press and Swipe or Drag

This gesture may be used to pick up and move a screen object on the AVDD UI. It uses the two finger long press command of the RC above followed by manipulation of the touch pad 702 in the desired direction of the swipe or drag, which is translated accordingly.

Two Finger Double Touch

This gesture may be used to implement a zoom out function. After using the Touch pad 702 to pan the cursor over the application user interface to an initial cursor position, the IR signal from the RC corresponding to a manipulation of the pause key 712 twice, albeit with a different time period between manipulations than used for the two finger long press described above, is translated to a simultaneous two finger long touch at locations on the UI adjacent or underneath the cursor.

Rotate

This gesture may be used to rotate presented content such as a map on the AVDD display 14. After using the Touch pad 702 to pan the cursor over the application user interface to an initial cursor position, the IR signal from the RC corresponding to a manipulation of the pause key 712, followed by manipulation of the channel up key 716, is translated as a clockwise rotation touch command. The IR signal from the RC corresponding to a manipulation of the pause key 712, followed by manipulation of the channel down key 718, can be translated as a counterclockwise rotation touch command.

Figure 8:
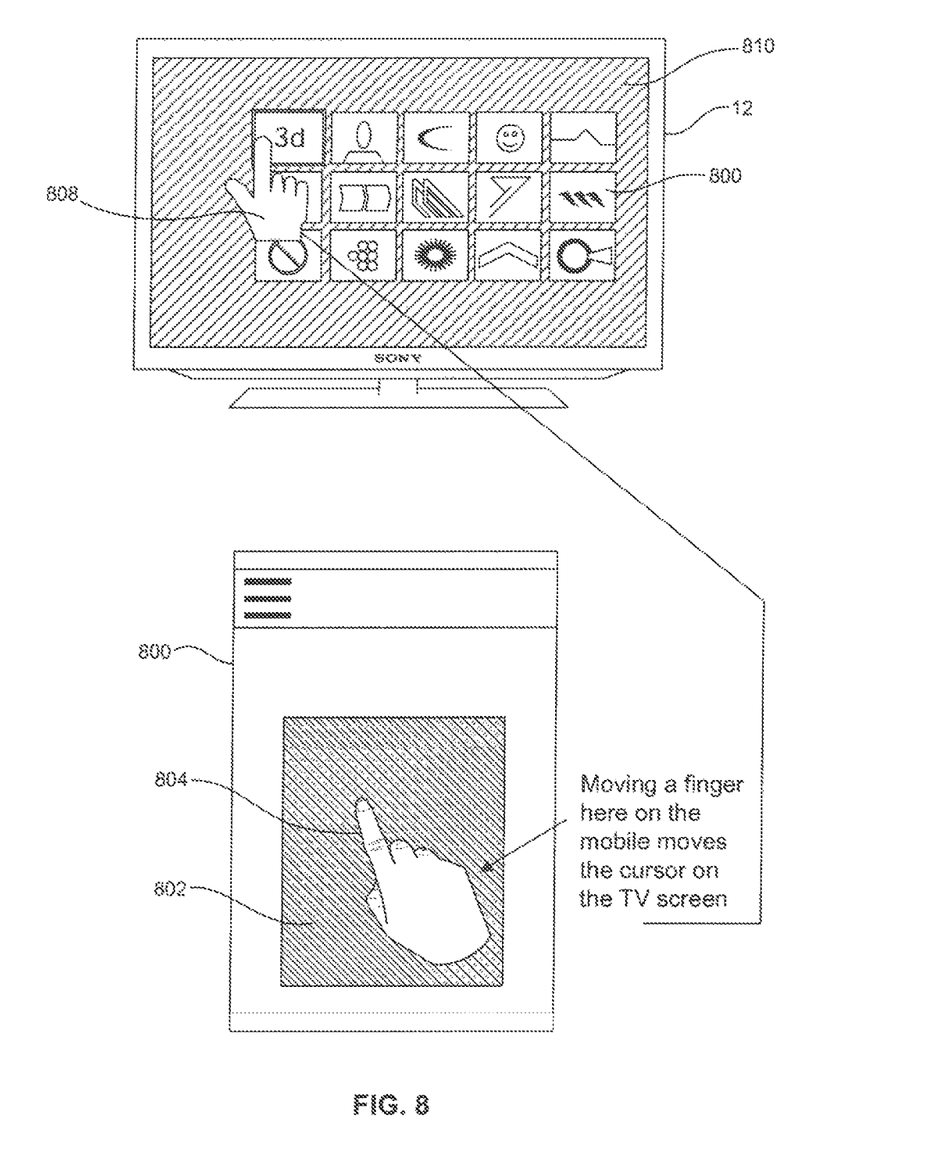
FIG. 8 is a schematic diagram showing the AVDD without a touch-sensitive display receiving touch commands direct from a mobile computing device with a touch sensitive display.

FIG. 8 shows a general purpose mobile computing device 800 such as a smart phone or a tablet computer with a touch screen 802 that receives touches from a user's hand 804 as shown. The device 800 wired or wirelessly communicates the touch signals from the touch screen 802 to the AVDD 12, which presents a touch-enabled UI 806 along with a screen cursor 808 on a non-touch sensitive display 810. The user viewing the cursor 808 on the UI 806 inputs touch gestures on the display 802 to cause the device 800 to send touch signals from the device 800 to move the cursor 808 on the display 810 and cause selections to be made from the UI 806, without any translation of the touch signals being required.

Figure 9:
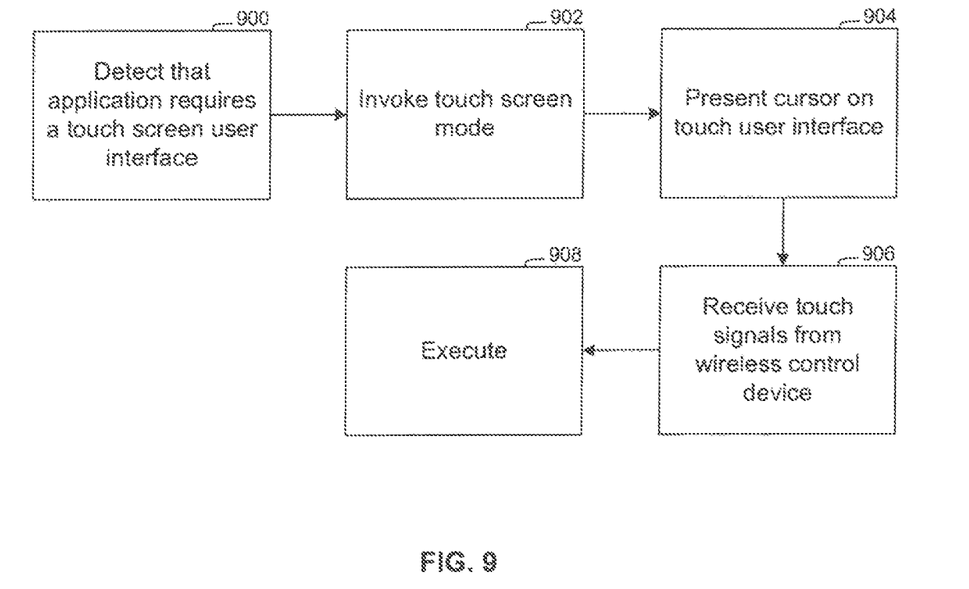
FIG. 9 is a flow chart of example logic that can be used by the AVDD in FIG. 8.

FIG. 9 illustrates logic that may be executed by the processor of the AVDD 800 running an operating system such as one based on Android®, on which Android software applications may execute. Commencing at block 900, the AVDD detects that an application has been invoked that requires a touch screen UI. The application may have been invoked by a user manipulating a key on the device 800. The AVDD 800 may determine that the invoked application requires a touch screen by inference on the basis that the AVDD 800 downloaded the application from a mobile device software section of an application provider website. Or, the AVDD may assume that touch mode is activated upon automatically detecting a WiFi, NFC, BlueTooth or USB connection with the device 800 using, e.g., Universal Plug-n-Play device discovery.

Regardless of how determined, the touch screen mode is invoked at block 902 and a touch interface is presented on the display 810 along with the screen cursor 808, such as a finger icon or hand icon, at block 904. The AVDD can communicate to the device that touch screen mode has been invoked, causing the device to send any touch commands it receives to the AVDD. Wireless signals from the device 800 generated by user touch gestures on the touch sensitive display 802 are received at block 906 and executed on the software application running on the AVDD 800 at block 908.

Figure 10:
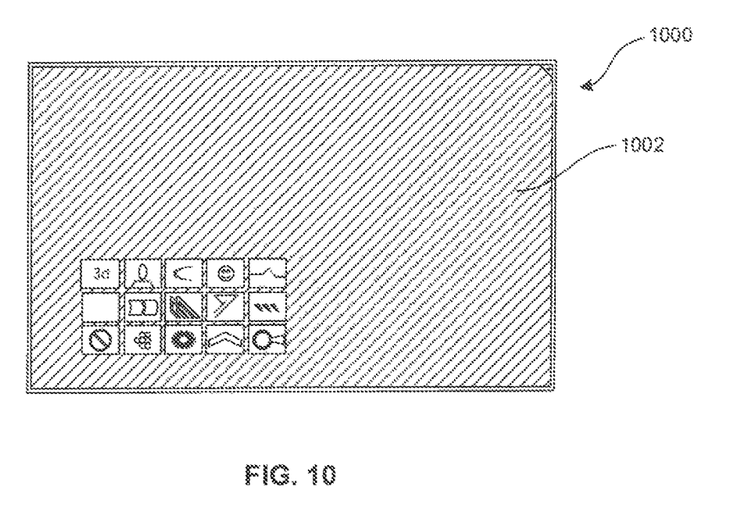
FIGS. 10 and 11 respectively show a general purpose mobile computing device and an AVDD, with the device mirroring the UI from the AVDD.

FIG. 10 shows that in another embodiment, any of the AVDDs discussed above can, upon discovering a general purpose mobile computing device 1000 such as any of the general purpose mobile computing devices described previously and responsive to entering a touch input mode according to any of the methods described previously, can send to the device 1000 the touch-enabled UI of the application being executed on the AVDD, for presentation of the UI on the touch sensitive screen 1002 of the device 1000.

Figure 11:
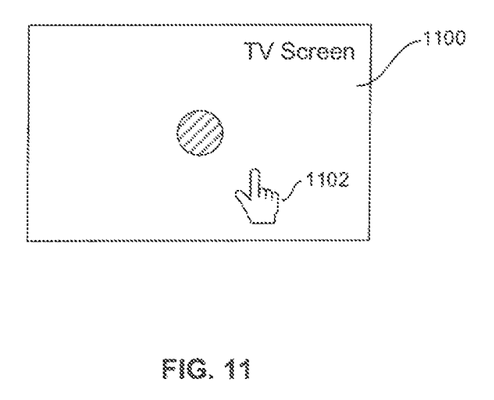

FIG. 11 illustrates a non-touch sensitive screen 1100 of an AVDD such as any of the AVDDs discussed above. The UI sent to the device 1000 may also be presented on the screen 1100. Responsive to a signal from the device 1000 indicating any gesture on the touch sensitive display 1002 shown in FIG. 10, the AVDD presents a cursor 1102 on the non-touch sensitive screen 1100. Any of the above-described touch signals may then be input directly on the touch sensitive display 1002 of the device 1000 and wired or wirelessly sent to the AVDD in FIG. 11 without further translation. Upon completion of executing the received touch command or upon termination of receiving the touch signal from the device 1000, the AVDD removes the screen cursor 1102 from view.

Note that even when the AVDD screen is touch sensitive, the principles above may be applied to allow for remote control of the touch-enabled UI executing on the AVDD.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. Apparatus comprising:
   at least one computer memory that is not a transitory signal and that comprises instructions executable by at least one processor to:
   receive non-touch screen signals from a remote control (RC) that does not have a touch screen display, the RC comprising at least one navigational ring manipulable to move a screen cursor, at least one select key, at least one trick play key, and at least one channel change key, the navigational ring being manipulable to produce the non-touch screen signals;
   translate the non-touch screen signals to corresponding touch screen signals; and
   execute the touch screen signals according to a user interface (UI) enabled for touch screen input, the UI executing on an audio video display device (AVDD), wherein manipulation of the navigational ring moves the screen cursor ring relative to the UI, and a signal generated by manipulation of the select key is translated to a touch at a location of the UI the screen cursor is positioned over.

2. The apparatus of claim 1, wherein the display of the AVDD is not touch sensitive.

3. The apparatus of claim 1, comprising at least one processor.

4. Apparatus comprising:
   at least one computer memory that is not a transitory signal and that comprises instructions executable by at least one processor to:
   receive non-touch screen signals from a remote control (RC) that does not have a touch screen display, the RC comprising at least one navigational ring manipulable to move a screen cursor, at least one select key, at least one trick play key, and at least one channel change key;
   translate the non-touch screen signals to corresponding touch screen signals; and
   execute the touch screen signals according to a user interface (UI) enabled for touch screen input, the UI executing on an audio video display device (AVDD), wherein a signal generated by manipulation of the trick play key followed by manipulation of the channel change key is translated as a rotation touch command.

5. Apparatus comprising:
   at least one computer memory that is not a transitory signal and that comprises instructions executable by at least one processor to:
   receive non-touch screen signals from a remote control (RC) that does not have a touch screen display, the RC comprising at least one navigational ring manipulable to move a screen cursor, at least one select key, at least one trick play key, and at least one channel change key;
   translate the non-touch screen signals to corresponding touch screen signals; and
   execute the touch screen signals according to a user interface (UI) enabled for touch screen input, the UI executing on an audio video display device (AVDD), wherein a signal generated by two manipulations of the select key is translated to a double touch at a location of the UI the screen cursor is positioned over.

6. Apparatus comprising:
   at least one computer memory that is not a transitory signal and that comprises instructions executable by at least one processor to:
   receive non-touch screen signals from a remote control (RC) that does not have a touch screen display, the RC comprising at least one navigational ring manipulable to move a screen cursor, at least one select key, at least one trick play key, and at least one channel change key;
   translate the non-touch screen signals to corresponding touch screen signals; and
   execute the touch screen signals according to a user interface (UI) enabled for touch screen input, the UI executing on an audio video display device (AVDD), wherein a signal generated by a manipulation of the select key followed by manipulation of the navigational ring is translated to a swipe command to cause the screen cursor to swipe in a direction the navigational ring is manipulated.

7. Apparatus comprising:
   at least one computer memory that is not a transitory signal and that comprises instructions executable by at least one processor to:
   receive non-touch screen signals from a remote control (RC) that does not have a touch screen display, the RC comprising at least one navigational ring manipulable to move a screen cursor, at least one select key, at least one trick play key, and at least one channel change key;
   translate the non-touch screen signals to corresponding touch screen signals; and
   execute the touch screen signals according to a user interface (UI) enabled for touch screen input, the UI executing on an audio video display device (AVDD), wherein a signal generated by a double manipulation of the select key with the two manipulations separated from each other by a period longer than a threshold period is translated to a long press command.

8. Apparatus comprising:
   at least one computer memory that is not a transitory signal and that comprises instructions executable by at least one processor to:
   receive non-touch screen signals from a remote control (RC) that does not have a touch screen display, the RC comprising at least one navigational ring manipulable to move a screen cursor, at least one select key, at least one trick play key, and at least one channel change key;
   translate the non-touch screen signals to corresponding touch screen signals; and
   execute the touch screen signals according to a user interface (UI) enabled for touch screen input, the UI executing on an audio video display device (AVDD), wherein a signal generated by a manipulation of the trick play key is translated to a pinch open command.

9. Apparatus comprising:
at least one computer memory that is not a transitory signal and that comprises instructions executable by at least one processor to:
receive non-touch screen signals from a remote control (RC) that does not have a touch screen display, the RC comprising at least one navigational ring manipulable to move a screen cursor, at least one select key, at least one trick play key, and at least one channel change key;
translate the non-touch screen signals to corresponding touch screen signals; and
execute the touch screen signals according to a user interface (UI) enabled for touch screen input, the UI executing on an audio video display device (AVDD), wherein a signal generated by manipulation of the trick play key is translated to a simultaneous two finger touch at locations adjacent or underneath the screen cursor.

10. Apparatus comprising:
at least one computer memory that is not a transitory signal and that comprises instructions executable by at least one processor to:
receive non-touch screen signals from a remote control (RC) that does not have a touch screen display, the RC comprising at least one navigational ring manipulable to move a screen cursor, at least one select key, at least one trick play key, and at least one channel change key;
translate the non-touch screen signals to corresponding touch screen signals; and
execute the touch screen signals according to a user interface (UI) enabled for touch screen input, the UI executing on an audio video display device (AVDD), wherein a signal generated by manipulation of the trick play key twice is translated to a simultaneous two finger long touch adjacent or underneath the screen cursor.

* * * * *